United States Patent [19]

Yonushonis

[11] Patent Number: 4,960,449
[45] Date of Patent: Oct. 2, 1990

[54] CERAMIC PARTICULATE TRAP AND METHOD OF MAKING THE SAME

[75] Inventor: Thomas M. Yonushonis, Columbus, Ind.

[73] Assignee: Cummins Engine Company, Inc., Columbus, Ind.

[21] Appl. No.: 316,766

[22] Filed: Feb. 28, 1989

[51] Int. Cl.⁵ .............................................. B01D 46/00
[52] U.S. Cl. ................................ 55/523; 55/DIG. 30; 60/311
[58] Field of Search .................. 55/DIG. 30, 484, 523; 60/311

[56] References Cited

U.S. PATENT DOCUMENTS

| | | | |
|---|---|---|---|
| 4,251,239 | 2/1981 | Clyde et al. | 55/132 |
| 4,652,286 | 3/1987 | Kusuda et al. | 55/523 |
| 4,732,594 | 3/1988 | Mizrah et al. | 55/523 |

FOREIGN PATENT DOCUMENTS

| | | |
|---|---|---|
| 3537976 | 4/1987 | Fed. Rep. of Germany . |
| 1453653 | 8/1966 | France . |

*Primary Examiner*—Charles Hart
*Attorney, Agent, or Firm*—Sixbey, Friedman, Leedom & Ferguson

[57] ABSTRACT

A ceramic particulate trap is disclosed and manufactured from a plurality of ceramic support plates each having a plurality of grooves in an upper surface and a lower surface thereof extending in a direction of fluid flow. Each groove in the upper surface of the ceramic support plate having an open upstream end and a closed downstream end while each groove in the lower surface of the ceramic support plate includes a closed upstream end and an open downstream end. A ceramic foam layer is then placed on and supported by the ceramic support plates and spans the open surface of the plurality of grooves formed in the upper surface of the support plate. The support plate being manufactured by conventional relatively inexpensive extrusion processes provides structural support for the ceramic foam layer. As the fluid containing the entrained particulate matter passes through the open ends of the grooves in the top surface of the ceramic plate, this fluid is restricted to pass through the ceramic foam layer and into the corresponding grooves in the lower surface of the support plate positioned adjacent the first support plate. By doing so, the particulate matter entrained within the fluid will be trapped in the ceramic foam layer supported by the ceramic support plate.

11 Claims, 2 Drawing Sheets

CERAMIC PARTICULATE TRAP AND METHOD OF MAKING THE SAME

TECHNICAL FIELD

The present invention relates to an exhaust gas filter for collecting exhaust gas entrained particles. More particularly, the present invention relates to a ceramic particulate trap for trapping particulates entrained in the exhaust gas of internal combustion engines, and a method of manufacturing such trap.

BACKGROUND OF THE INVENTION

Presently, ceramic materials are being used to filter gas entrained carbon particulates from the exhaust streams of diesel engines. These various filtering methods rely on the porosity of the ceramic filter as well as gas permeation through the ceramic filter walls. By the year 1994, new particulate emission standards set by the Environmental Protection Agency (EPA) will require all urban buses and heavy duty trucks to emit less than 0.1 grams per horsepower hour of particulate matter. Particulates are defined by EPA as any matter in the exhaust of an internal combustion engine, other than condensed water, which is capable of being collected by a standard filter after dilution with ambient air at a temperature of 125° F. Included in this definition are, conglomerated carbon particles, absorb hydrocarbons, including known carcinogens and sulfates.

These particulates are very small in size having a mass medium diameter of 4–12 micro inches, and are extremely light weight. During the life of the typical vehicle, approximately 20 cubic feet of particulate matter which must be trapped will be emitted per 100 thousand miles of engine operation.

Presently, ceramic materials are being used to filter these gas entrained carbon particulates from the exhaust streams of diesel engines. These filters and filtering methods rely extensively on the porosity of the filter and the gas permeation through the filter walls. A major concern when utilizing such particulate filters in diesel engine exhaust streams, is to obtain the largest possible trapping area or trapping volume so as to minimize a build-up of back pressure in the exhaust system. At the present time, one of the most effective filters in achieving the above stated goals is a honeycomb extruded structure formed of an extruded ceramic material as is shown in U.S. Pat. No. 4,464,185 issued to Tomita et al. Therein, a honeycomb structure is formed by extruding a slurry material to form a body having a plurality of passageways therethrough. Once this body has been obtained the ends of the honeycomb structure are covered and inlet and outlet passages are formed in an alternate manner, i.e. an alternate matrix of opened end and closed end passageways are formed. However, this large and fragile honeycomb structure must be manufactured to meet the specifications of each individual exhaust system and any flaws or subsequent damage to this structure will render the filter unusable.

One solution to the above mentioned problem is disclosed in U.S. Pat. No. 4,251,239 to Clyde et al., wherein a ceramic sponge is formed from a plurality of structures which are stacked one upon the other and subsequently dipped into a ceramic slurry and squeezed to remove excess material therefrom, such that only the sponge fibers are coated. However, as above this structure must also be formed to the specification of the specific exhaust system in which it is be installed and consequently any flaws or damage to the structure will render the structure as a whole unuseable.

In U.S. Pat. No. 4,652,286 to Kusuda et al. an exhaust gas filter for diesel particulates is disclosed which comprises a plurality of corrugated sheets and plain flat sheets which are bonded together to form the filter structure. The ceramic fiber sheets are produced by a paper forming method wherein a ceramic fiber is chopped into short fibers and dispersed into water. A silica-alumina clay is then mixed with the fibers along with an organic binder and an organic fiber to form a slurry. This slurry is then placed in a forming die and vacuum drained to form the above mentioned sheets. These sheets are then fired to form the final product. The exhaust gas containing the entrained particles then flows through the openings in the upstream end of the corrugated sheet through the porous walls of the sheet and exits through the openings in the downstream end of the sheet. Porous sheets of this type by their inherent nature are extremely fragile and may become damaged during their formation or when in use in the exhaust system of a diesel engine resulting in the necessary replacement of the entire structure since the sheets which form this structure are permanently bonded together.

Therefore as is clear from the above, there is a need for an exhaust gas particulate trap which may be formed in a simple manner, which is durable and which can be repaired without the need to replace the entire structure constituting the filter.

SUMMARY OF THE INVENTION

In view of the foregoing, it is an object of the present invention to provide a ceramic particulate filter for diesel exhaust gas which can be easily fabricated by standard ceramic extrusion processes.

Another object of the present invention is to form diesel particulate filters of varying sizes from a plurality of identical ceramic plates.

Yet another object of the present invention is to form a ceramic particulate trap having a strong filter support structure for a weaker filtering element.

Yet another object of the present invention is to provide a ceramic particulate trap composed of a plurality of individual filtering plates such that each plate can be individually inspected and, if necessary, replaced without rendering the entire particulate trap unusable.

These as well as other objects of the present invention are achieved by manufacturing a ceramic particulate trap from a plurality of ceramic support plates each having a plurality of grooves in an upper surface and a lower surface thereof extending in a direction of fluid flow, with each groove in the upper surface of the ceramics support plate having an open upstream end and a closed downstream end while the grooves in the lower surface of the ceramic support plate include a closed upstream end and an open downstream end. A ceramic foam layer is then placed on and supported by the ceramic support plates and spans the open surface of the plurality of grooves formed in the upper surface of the support plate.

The support plate is manufactured by conventional relatively inexpensive extrusion processes and provides structural support for the ceramic foam layer. The extrusion of the ceramic support plate is done such that each groove provided in the top surface of the support plate includes a corresponding mirror image groove in the bottom surface of the ceramic support plate. Therefore, as the fluid containing the entrained particulate matter passes through the open ends of the grooves in the top surface of the ceramic plate, this fluid is restricted to pass through the ceramic foam layer and into the corresponding grooves in the lower surface of the support plate positioned adjacent the first support plate. In doing so, the particulate matter entrained within the fluid will be trapped in the ceramic foam layer supported by the ceramic support plate.

The above as well as other advantages of the present invention will become apparent from the figures and the following description of the preferred embodiment.

DETAILED DESCRIPTION OF THE PREFERRED EMBODIMENT

FIGS. 1-4 illustrate a ceramic particulate trap in accordance with the present invention. The ceramic particulate trap 1 is formed of a plurality of identical support plates 2, 4 and 6. The number and size of the ceramic support plates may vary depending upon their intended use, however, to provide for the greatest efficiency, each plate is formed of a standard dimension and thus the size of the entire particulate trap will be dependent upon the number of ceramic support plates which are used. The ceramic particulate trap 1 illustrated in the figures also includes a top plate 10 and a bottom plate 12, so as to provide the trap with grooveless top and bottom surfaces.

Figure 5:
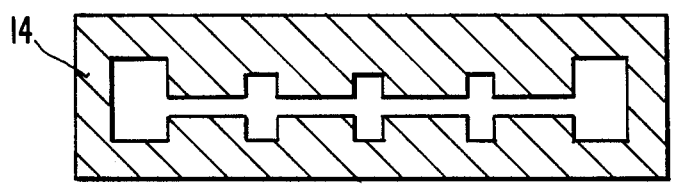

Each of the above-mentioned ceramic support plates 2, 4 and 6 are formed by extruding a ceramic slurry material through the die 14 shown in FIG. 5 in a conventional manner. It should be noted from FIGS. 4 and 5, that the grooves formed in the upper surface and lower surface of the support plates are symetrically arranged such that when the support plates are stacked one upon the other the open upper surface of the grooves 16 communicate with the downwardly extending open surface of the grooves 18. Once the ceramic support plates have been extruded, what will be the downstream end of the upper grooves 16 is closed off and what will be the upstream end of the lower grooves 18 is closed off such that there is one flow path through the respective support plates as can be seen in FIG. 3.

These ceramic support plates are formed of a nonporous ceramic material such that the fluid flowing through the completed particulate trap is restricted to flow only through the grooves 16 and 18 in the upper and lower surfaces. The respective support plates form a strong support structure for a weaker filtering element and are capable of being stacked one upon the other to form a particulate trap meeting the requirements of a variety of systems.

Once the support plates have been formed by the above-mentioned extruding process, a ceramic foam filtering layer 20 is disposed upon the top of the groove 16 formed in the upper surface of the support plate. The ceramic foam layers are supported by the lateral edges 22 and 22═ of the respective support plate as well as the longitudinally extending ribs 24 provided between each of the grooves 16 in the upper surface of the support plate. Once the ceramic foam filtering layer 20 is in place, the several support plates each having a ceramic foam filtering layer thereon can be stacked in the manner shown in FIG. 4 such that the ribs 25 provided between each of the grooves 18 in the lower surface of the support plate contact an upper surface of the ceramic foam filtering layer of the adjacent ceramic support plate, thereby aiding in the placement and retention of these elements.

Figure 3:
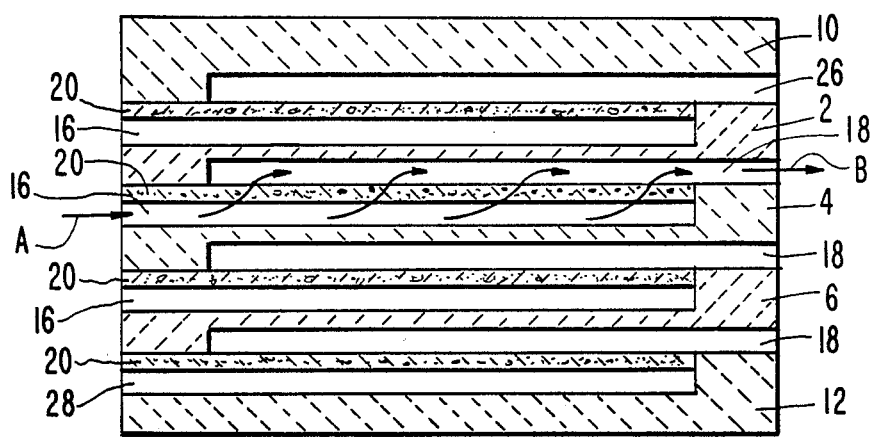
FIG. 3 is a cross section of the ceramic particulate trap shown in FIG. 1 taken along line III—III.
Figure 4:
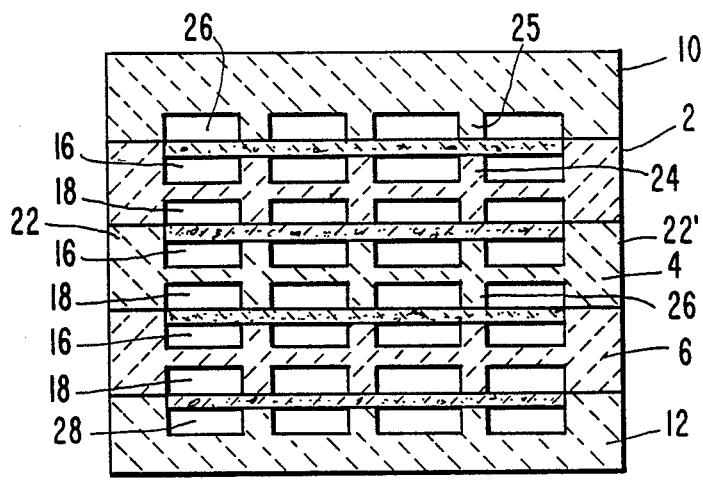
FIG. 4 is a cross sectional view of the ceramic particulate trap in accordance with the present invention taken along line IV—IV of FIG. 1.

As can be seen in FIG. 3, the ceramic foam filtering layer 20 extends nearly the entire longitudinal length of the support plate and forms a filtering structure between the upper grooves 16 and the lower grooves 18 of adjacent support plates. By providing the foam filtering layer in such a manner, a large surface area is provided such that a large amount of particulate matter can be trapped while minimizing the back pressure experienced when such filters are used.

As will be appreciated, the final size of the particulate trap is determined by the number of ceramic support plates which are stacked one upon the other. When stacking the support plates, a ceiling gasket or caulking material may be provided between each plate such that the fluid containing the entrained particles cannot flow through the joints formed between the plates and consequently bypassing the foam filtering layer 20. Additionally, by forming the ceramic particulate trap from a plurality of stacked individual support plates having fragile foam filtering layers thereon, if a flaw or damage is detected in any individual support plate, this support plate may be readily removed from the ceramic particulate trap and replaced without destroying the integrity of the other elements of the ceramic particulate trap. Therefore, it can be seen that only individual support plates need be replace resulting in a significant cost reduction in the application and maintenance of such filters.

Consequently, each support plate having the foam filtering layer thereon can be individually inspected prior to their assembly to form the required particulate trap. Further, if during the life of the particulate trap a flaw is detected or damage to the particulate trap is sustained, the particulate trap may be disassembled, each support plate individually inspected and the damaged plate replaced thereby minimizing the cost related to the replacement of the entire particulate trap.

In accordance with a preferred embodiment of the invention, top and bottom plates 10 and 12 are provided. The top plate 10 includes grooves 26 in a lower surface thereof similar to grooves 18 provided in each of the support plates 2, 4 and 6 and the bottom plate 12 includes grooves 28 which are similar to those grooves 16 formed in the individual support plates 2, 4 and 6.

Figure 1:
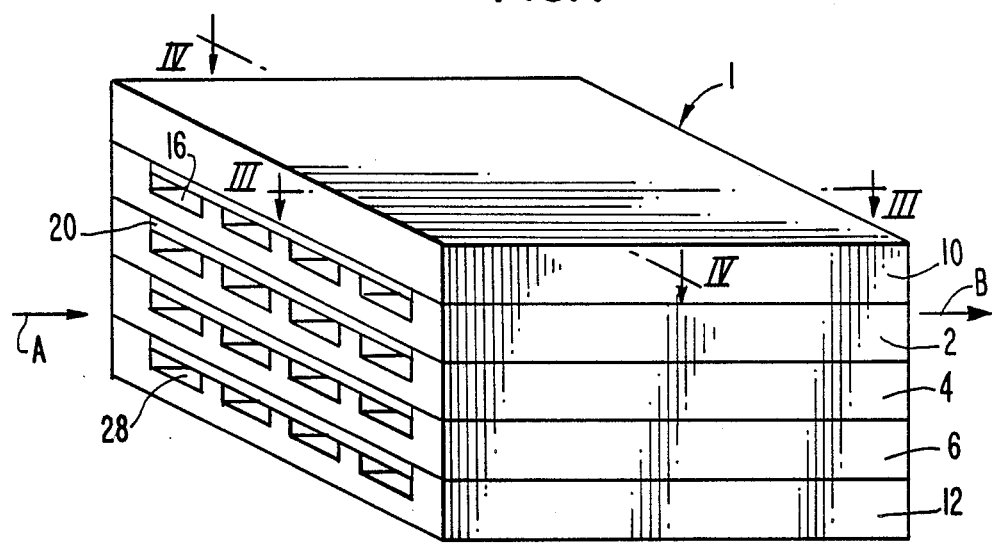
FIG. 1 is a perspective view showing the upstream face of a ceramic particulate trap formed in accordance with the present invention.
Figure 2:
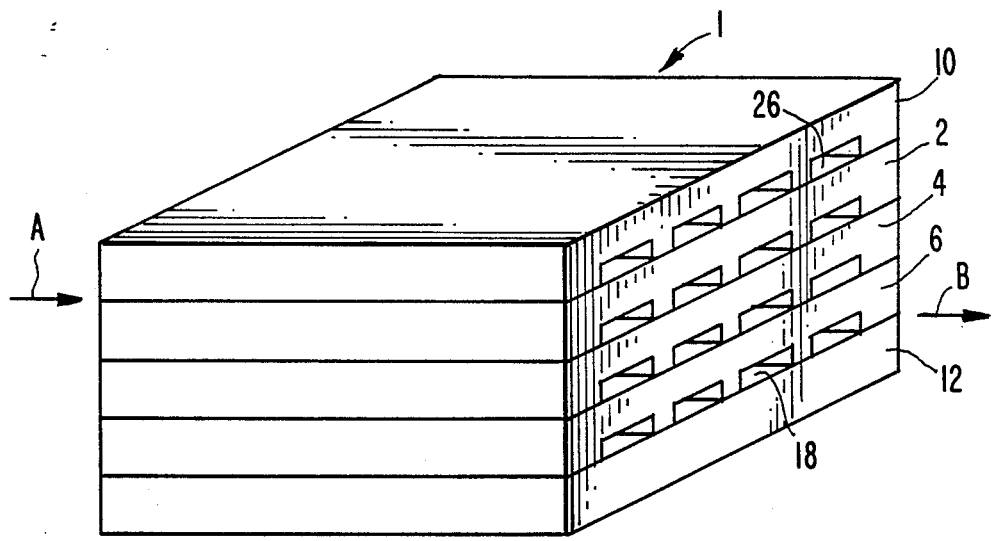
FIG. 2 is a perspective view corresponding to FIG. 1 illustrating the downstream end of the ceramic particulate trap in accordance with the present invention.

As is shown in FIGS. 1, 2 and 3, the fluid containing the entrained particles to be trapped enters the upstream end of the particulate trap as shown by arrow A and exit the downstream end of the trap as show by arrow B. This fluid to be filtered is restricted to flow initially through the grooves 16 and 28, which may be accessed through the upstream end of the particulate trap. As shown in FIG. 3, this fluid flows into the open grooves and is forced to pass through the foam filtering layer 20 provided between each of the suport plates. As the fluid flows through the foam filtering layer 20 the entrained particules will be trapped within the matrix structure of the foam filtering layer 20 as the fluid flows from the grooves 16 and 28 into the grooves 18 and 26 which will subsequently exit through the downstream open end of the grooves 18 and 26. Again, as can be noted in FIG. 3, the foam filtering layers 20 extend in the direction of flow of the fluid to be filtered, so as to provide a large surface area for trapping entrained particulates while minimizing back pressure buildup.

When the ceramic particulate trap described above is to be utilized in the exhaust stream of diesel engines for filtering carbon particulates entrained within the exhaust gas, resistance heating elements (not shown) may be positioned adjacent to or embedded within the trap structure to heat the foam filtering material. In doing so, because the entrained particles of diesel exhaust gas are organic in nature, a portion of these particulates may be oxzidized due to the increase in temperature and expelled from the particulate trap further minimizing the back pressure experienced in the system.

While the invention has been described with reference to a preferred embodiment, it should be appreciated by those skilled in the art that the invention may be practiced otherwise than as specifically described herein without departing from the spirit and scope of the invention. It is, therefore, to be understood that the spirit and scope of the invention be limited only by the appended claims.

INDUSTRIAL APPLICABILITY

The above-described particulate trap may be positioned within the flow stream of any fluid containing entrained particles wherein it is desired to remove such particles from the fluid prior to its further distribution. A particulate trap of this type may be readily adapted to filter any fluid medium containing such entrained particles. More particularly, the ceramic particulate trap formed in accordance with the present invention is ideal for use in the exhaust streams of internal combustion engines. The size of the particulate trap may be readily adapted to filter gas entrained particles of varying engine capacities while allowing for individual inspection of the various filter elements and the ability to maintain the particulate trap in a cost efficient manner.

I claim:

1. A particulate trap for filtering particulate matter entrained in a fluid passing therethrough comprising:
    at least one substantially non porous support plate having a plurality of grooves formed in an upper surface thereof extending in a direction of fluid flow and ribs formed between each of said grooves, with each of said grooves having an open upstream end, a closed downstream end and an open surface extending in said direction of fluid flow; and
    a ceramic foam layer for filtering said particulate matter positioned on and supported by said ribs so as to overly said open surface;
    wherein said fluid is restricted to flow through said grooves and through said ceramic foam layer such that said entrained particulate matter is removed from said fluid during the flow of said fluid through said particulate trap.

2. The particulate trap as defined in claim 1, wherein said support plate further includes at least one groove formed in a lower surface thereof extending in said direction of fluid flow having an open downstream end and a closed upstream end.

3. The particulate trap as defined in claim 2, wherein a plurality of said support plates are stacked one upon the other such that each respective ceramic foam layer is disposed between said grooves formed in said upper surface of a first plate and said grooves formed in said lower surface of an adjacent support plate positioned atop said first support plate, such that said fluid is further restricted to flow through said grooves in said lower surface of said adjacent support plate after passing through the respective ceramic foam layer.

4. The particulate trap as defined in claim 3, further comprising a top support plate and a bottom support plate, wherein said top support plate includes grooves only in a lower surface thereof, and said bottom plate includes grooves only in an upper surface thereof.

5. The particulate trap as defined in claim 1, wherein said support plate is formed by extrusion.

6. A particulate trap for filtering particulate matter entrained in a fluid passing therethrough comprising:
    a plurality of substantially non porous support plates stacked one upon the other each having a plurality of grooves formed in an upper surface and a lower surface thereof, each of said grooves extending in a direction of fluid flow and having an upstream end, a downstream end and an open surface extending from said upstream end to said downstream end with each of said grooves of said upper surface having a closed downstream end and each of said grooves of said lower surface having a closed upstream end; and
    a plurality of filtering means for filtering said particulate matter, a respective one of said filtering means being supported by a respective one of said support plates so as to overly said open surface of said upper grooves and to underlie said open surface of said lower grooves;
    wherein said grooves formed in said upper surface of a first support plate communicate with said grooves formed in said lower surface of an adjacent support plate with said fluid being restricted to flow into said grooves in said upper surfaces of said support plates, through said respective filtering means supported thereon and out said grooves formed in said lower surfaces of said support plates.

7. The particulate trap as defined in claim 6, wherein said plurality of filtering means are ceramic foam layers.

8. The particulate trap as defined in claim 6, further comprising a top support plate and a bottom support plate, wherein said top support plate includes grooves only in a lower surface thereof, and said bottom support plate includes grooves only in an upper surface thereof.

9. The ceramic particulate trap as defined in claim 6, wherein said support plate is formed by extrusion.

10. The particulate trap as defined in claim 9, wherein said extruded support plate is formed of a nonporous ceramic material.

11. A filter element for filtering particulate matter entrained in a fluid passing therethrough comprising:
    a substantially non porous support plate having a plurality of upper grooves formed in an upper surface thereof extending in a direction of fluid flow and ribs formed between each of said grooves with each of said upper grooves having an open upstream end, a closed downstream end and an open surface extending in said direction of fluid flow, and a plurality of lower grooves formed in a lower surface thereof extending in said direction of fluid flow with each of said lower grooves having a closed upstream end, an open downstream end and an open surface extending in said direction of fluid flow; and a ceramic foam layer for filtering said particulate matter positioned on and supported by said ribs so as to overly said open surface of said upper grooves;

wherein said fluid is restricted to flow through said upper grooves and through said ceramic foam layer such that said entrained particulate matter is removed from said fluid during the flow of said fluid through a particulate trap formed of a plurality of said filter elements.

* * * * *